US012498687B2

United States Patent
Kopp

(10) Patent No.: US 12,498,687 B2
(45) Date of Patent: Dec. 16, 2025

(54) POWER MANAGEMENT SYSTEM AND METHOD FOR MANAGING POWER DISTRIBUTION

(71) Applicant: HONDA MOTOR CO., LTD., Tokyo (JP)

(72) Inventor: Martin Kopp, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 17/746,868

(22) Filed: May 17, 2022

(65) Prior Publication Data

US 2022/0373986 A1  Nov. 24, 2022

(30) Foreign Application Priority Data

May 18, 2021  (EP) ..................... 21174309

(51) Int. Cl.
*G05B 19/042* (2006.01)
*B60L 50/60* (2019.01)
(Continued)

(52) U.S. Cl.
CPC ............ *G05B 19/042* (2013.01); *B60L 50/60* (2019.02); *B60L 55/00* (2019.02); *H02J 3/004* (2020.01);
(Continued)

(58) Field of Classification Search
CPC .......... B60L 55/00; B60L 50/60; H02J 3/004; G05B 19/042
See application file for complete search history.

(56) References Cited

U.S. PATENT DOCUMENTS

2008/0046387 A1* 2/2008 Gopal ................... H02J 3/008
                                                 705/412
2011/0221393 A1* 9/2011 Billmaier ................. H02J 3/02
                                                 320/109
(Continued)

FOREIGN PATENT DOCUMENTS

WO    2019243524 A1   12/2019

OTHER PUBLICATIONS

Office Action issued for counterpart Japanese Application No. 2022-073904, transmitted from the Japanese Patent Office on Sep. 2, 2025 (drafted on Aug. 27, 2025).

*Primary Examiner* — Mohammad Ali
*Assistant Examiner* — Vincent W Chang

(57) ABSTRACT

A power management system, comprises a power generating unit, a power output unit to distribute the electrical power generated by the power generating unit to a household and to a receiving unit, different from the household, wherein the receiving unit is a battery and/or a power grid, a grid power output unit to output electrical power supplied from a power grid to the household and/or to the receiving unit, a condition requirement setting unit to receive condition requirement data and a time period after which the receiving unit has to satisfy the required condition, a prediction data input unit to receive prediction data that indicates a prediction of the electrical power generated by the power generating unit over the time period, a control unit that is adapted to receive the condition requirement data from the condition requirement setting unit and the prediction data from the prediction data input unit.

11 Claims, 7 Drawing Sheets

(51) Int. Cl.
*B60L 55/00* (2019.01)
*H02J 3/00* (2006.01)
*H02J 7/00* (2006.01)
*B60L 58/12* (2019.01)

(52) U.S. Cl.
CPC ............ *H02J 7/0048* (2020.01); *B60L 58/12* (2019.02); *G05B 2219/2639* (2013.01); *H02J 2300/24* (2020.01); *H02J 2300/28* (2020.01)

(56) References Cited

U.S. PATENT DOCUMENTS

| | | | |
|---|---|---|---|
| 2013/0093393 A1* | 4/2013 | Shimotani | G01C 21/3469 |
| | | | 320/109 |
| 2013/0346308 A1* | 12/2013 | Naito | B60L 53/68 |
| | | | 705/41 |
| 2014/0172182 A1 | 6/2014 | Subbotin | |
| 2014/0200723 A1* | 7/2014 | Roy | H02J 3/46 |
| | | | 700/291 |
| 2015/0094969 A1* | 4/2015 | Jungerman | H02S 50/10 |
| | | | 702/61 |
| 2015/0217657 A1 | 8/2015 | Kang | |
| 2017/0054410 A1* | 2/2017 | Chen | H02J 3/381 |
| 2018/0312072 A1* | 11/2018 | Yang | B60L 55/00 |
| 2020/0213315 A1* | 7/2020 | Paraggio | G05B 19/042 |
| 2020/0244071 A1* | 7/2020 | Smith | B60L 50/60 |
| 2022/0185142 A1* | 6/2022 | Park | G01R 31/385 |

\* cited by examiner

POWER MANAGEMENT SYSTEM AND METHOD FOR MANAGING POWER DISTRIBUTION

BACKGROUND

1. Technical Field

The present invention refers to a power management system and a method for managing power distribution.

2 Related Art

In recent years, many houses have been equipped with private power plants using renewable energy sources, such as solar power, in order to be able to generate at least some of the electrical power needed in the household on their own. But, as electrical vehicles and house-batteries (generally referred to herein as "receiving unit") that store energy so that it is available independently from the renewable energy source, become more and more popular, the overall consumption of electrical energy rises such that, most of the time, the household and the receiving unit need to be supplied with power from the private power plant as well as with power from a power grid. Since electrical power from a power grid has to be bought from a power supplier and is not as ecological as generating electrical power on your own, an intelligent and adaptable strategy is needed to maximize the use of the private power plant.

GENERAL DISCLOSURE

It is, therefore, an object of the present invention to provide a power management system and a method for managing power distribution that are capable to improve the use of the private power plant and/or to reduce the overall costs for the user of the system according to the present invention.

This object is solved in a first aspect of the present invention by a power management system, comprising
- a power generating unit that is adapted to generate electrical power from a non-electric power source,
- a power output unit that is adapted to output the electrical power generated by the power generating unit to a power distributing unit, wherein the power distributing unit is adapted to distribute the electrical power generated by the power generating unit to a household having a plurality of power consuming units and to a receiving unit, different from the household, wherein the receiving unit is a battery and/or a power grid,
- a grid power output unit that is adapted to output electrical power supplied from a power grid to the household and/or to the receiving unit,
- a condition requirement setting unit that is adapted to receive condition requirement data from a user that determine a required condition of the receiving unit and a time period after which the receiving unit has to satisfy the required condition,
- a prediction data input unit that is adapted to receive prediction data that indicates a prediction of the electrical power generated by the power generating unit over the time period,
- a control unit that is adapted to receive the condition requirement data from the condition requirement setting unit and the prediction data from the prediction data input unit,
- wherein the control unit that is adapted to control at least the power distributing unit such that, after the time period has elapsed, the receiving unit is satisfying the required condition, and is adapted to maximize the percentage of using electrical power generated by the power generating unit in relation to electrical power supplied from the power grid to satisfy the required condition of the receiving unit within the time period by using the prediction data,
- wherein the prediction data is based on at least one of a given maximum power output of the power generating unit, an availability of the receiving unit within the time period, and a weather forecast for the time period and for the location where the power generating unit is located.

In particular, the present invention makes it possible to execute a power distribution strategy, e.g. a charging strategy of a battery connected to the private power plant (power generating unit), that is in between the two currently possible charging strategies of providing the household and the receiving unit, e.g. to charge the battery as fast as possible, with as much power as possible, wherein according to this strategy a maximum amount of electrical power from a power grid has to be used, and of only using electrical power generated by the power generating unit (at least for the receiving unit), wherein, using this latter strategy, a required condition of the receiving unit may not be reached within the time period.

Based on the prediction data, the system according to the present invention may consider to reduce the amount of electrical power generated by the power generating unit that is distributed to the receiving unit and to increase the amount that is distributed to the household, for example in the case in which the prediction data indicates that the power generating unit is able to generate more electrical power than currently available at a later time, but still within the time period.

To give an example, assuming that the power generating unit is a wind generator, that the receiving unit is an electrical vehicle (EV) that can be charged by electrical power generated by the wind generator, and that the required condition is that the EV has to reach a state of charge (SOC) of 90% in 14 hours from a current moment, the prediction data may indicate that, after 4 hours from now, the wind will be stronger so that more electrical power generated by the wind generator will be available. Hence, the control unit is reducing the amount of electrical power generated by the wind generator to the EV, and, consequently, is postponing the point of time, when the SOC of 90% will be reached, within the 14 hours time period, such that, at this time, more (if not all) of the power consumed by the household can be supplied from the wind generator. This increases the usage of the wind generator and also decreases the power costs for the household, since less power has to be bought from a power supplier.

Of course, in this regard, the system may be self-adjusting in that it may record and determine a regular use of the receiving unit, for example a departure time of the EV every day from Monday to Friday at 8:30 a.m., a reconnection of the EV to the power generating unit at 5:30 p.m., and a regularly consumed energy of approx. 20% of the battery's total capacity. So, the control unit may set the required condition of at least 20% SOC for every day from Monday to Friday at 8:30 a.m. automatically without any input from the user. When the EV (or the receiving unit in general) is connected to the control unit, the EV may send information that indicate an actual condition, e.g. an actual SOC, of the EV.

In another example that may also be combined with the example described above, electrical power generated by the power generating unit may be fed-in to a power grid. This, in particular, may be combined with some incentive for the user, such as money paid from a power supplier. Many providers limit the amount of electrical power that can be fed-in to the power grid, for example to reduce peeks or shortages in the grid. Here, the system according to the present invention may keep the amount of electrical power fed into the power grid at a more constant rate and optimize the use of the private power plant. That is, the control unit may prioritize the distribution of electrical power generated by the power generating unit to the power grid at a higher rank than a distribution of the energy to charge a battery, if a shortage to supply both with the needed energy is present, based on prediction data that indicate that the power generating unit will provide sufficient electrical power to charge the battery within the time period at a later time.

Especially, but not limited to, a cost optimization of the household's power costs, costs to buy power from a power supplier as well as respective incentives (e.g. earnings) when selling power to the power supplier can be input into the system as further consideration data to adjust the control of the control unit.

A location of the power generating unit may be indicated to the system by the postal code of the corresponding area. Based on the location, an expected solar radiation energy in cloudless weather, for example, may be determined and used for a calculation of a necessary time to reach the required condition of the receiving unit, e.g. to charge the battery to the requested SOC, for example.

In an embodiment of the present invention, the prediction data may further be based on an actual power output of a reference power generating unit measured by a power output measuring unit connected to the reference power generating unit, wherein the reference power generating unit and the power output measuring unit are remote from the power generating unit. This makes it possible that the power generating unit itself is free of measurement equipment that is adapted to measure the output of the electrical power generated by the power generating unit such that the overall costs for the installation and maintenance of the power generating unit can be reduced.

As a very simple example, if the reference power generating unit is identical to the power generating unit and is installed in an identical manner (orientation, inclination etc.) at a next door neighbor, the measurement of the electrical power generated by the reference power generating unit can be directly used for a determination of the electrical power generated by the power generating unit due to the same weather of both power generating units. Based on the determination of the electrical power generated by the power generating unit, the system according to the present invention can also determine the amount of energy that has to be taken from a power supplier. The same may also be applicable for a determination of the electric power needed in the household connected to the power generating unit by using the actual measured electric energy consumption of a household connected to the reference power generating unit (also referred to as a reference household).

However, there are multiple reasons why the measurements of the electrical power generated from the identical reference power generating unit may still not match exactly to the electrical power generated by the power generating unit. For example, one of the power generating units may be cleaner than the other or there may be a tree or a house that is blocking the solar radiation on only one of the power generating units. To validate the accuracy of the determination, a determined amount of electrical power that has to be taken from a power supplier, because the electrical power generated by the power generating unit is not enough, may be compared to an actual amount of electrical power taken from a power supplier. Doing so, a comparison of estimated values with values from a power meter may be performed on a regular basis, for example in intervals of 3 month, 6 month and/or 12 month.

In this context, the prediction data for the power generating unit based on the actual power output of the reference power generating unit may be scaled with respect to at least one of a difference of a maximum power output of the reference power generating unit and the maximum power output of the power generating unit, a different orientation of the reference power generating unit and the power generating unit, a different inclination of the reference power generating unit and the power generating unit, a different weather forecast and/or a different actual weather of the reference power generating unit and the power generating unit, and a different location of the reference power generating unit and the power generating unit. This makes it possible to use a power plant as a reference power generating unit that is not identical to the power generating unit. For example, at different locations, that are especially largely spaced apart in the north-south-direction of the earth, a different solar power is available, even if the weather is cloudless at both locations.

Advantageously, the reference power generating unit may be connected to a server and may be adapted to send data indicating the actual power output of the reference power generating unit to a server being remote from the reference power generating unit and the power generating unit, and the prediction data input unit may be adapted to receive prediction data from the server, wherein the server may be adapted to scale the prediction data, wherein, preferably, the condition requirement setting unit and/or the prediction data input unit and/or the control unit may be part of the server such that the user may send the condition requirement data to the server, wherein the power distributing unit may be controlled by the server via a remote connection. Thus, a direct connection between the reference power generating unit and the power generating unit is not necessary. Furthermore, it may be possible to use a plurality of reference power generating units to enhance the accuracy of the estimation/determination regarding the electrical power generated by the power generating unit. The optional feature may further reduce the components installed at the location of the power generating unit and reduce associated costs. The data may be exchanged via the internet and may be input by the user via a user terminal, such as a smartphone.

Furthermore, the power management system may further comprise a storage unit that is adapted to record and store a difference of a predicted condition of the receiving unit after the time period and an actual condition of the receiving unit after the time period and/or a difference of a predicted time period necessary to reach the required condition of the receiving unit and an actual time period necessary to reach the required condition of the receiving unit, wherein the prediction data for the power generating unit may further be based on the difference stored in the storage unit. If, for example, the required condition of the receiving unit is not reached at the end of the time period or is reached earlier than calculated, the prediction data may be adapted for future calculations based on this difference to increase a prediction accuracy.

In addition to the above, preferably, the storage unit may further be adapted to record and store the difference in correlation to a specific date and time so that it may be possible to identify differences of the predicted electrical power generated by the power generating unit and the actual electrical power generated by the power generating unit that occur in a repeating pattern. In the example of a difference that occurs only in January and February (when the sun is low on the northern hemisphere) and, for example, also at specific times of a day, in particular if detected in succeeding years, it may be assumed that an obstacle, like a house or a tree, is blocking the solar radiation onto the power generating unit (but not onto the reference power generating unit). This difference can then be considered in future predictions in order to improve the accuracy of the prediction.

In an embodiment of the present invention, the non-electric power source may be at least one of a photovoltaic solar power plant, a wind generator, a geothermal energy source, a hydrodynamic energy source, and a biomass energy source. Of course, the above given examples of a power generating unit (private power plant) are not necessarily limited to power plants of a single household but may even comprise power plants that supply multiple households with electrical power.

Also according to the present invention, the battery may be installed in an electric vehicle or a hybrid electric vehicle and/or at a location of the power generating unit as a battery for the household.

By way of example, the required condition of the receiving unit may be a state of charge of the battery and/or a feed-in rate of the electrical power generated by the power generating unit to the power grid. In combination with a determination of the required condition, a strategy to reach this required condition may be selected, e.g. by the user. So, if it is the required condition to charge an EV's battery to 90% within 14 hours, a first selectable strategy may be to reach the 90% SOC as fast as possible, a second selectable strategy may be to reach the 90% SOC as late as possible to have a maximum amount of electrical power generated by the power generating unit distributed to the household and/or the power grid, and a third selectable strategy may be to reach the 90% SOC based on a predetermined minimum "green percentage" to reach the required condition, i.e. a minimum percentage of electrical power generated by the power generating unit when charging the battery. It may only be allowed to go below this minimum percentage in the case that the required condition cannot be reached within the time period.

In another aspect, the present invention refers to a power management system, comprising
an amount of m power generating units that are each adapted to generate electrical power from a non-electric power source, wherein m is a natural number and m≥2,
wherein out of the m power generating units, an amount of n are reference power generating units, wherein n is a natural number and n<m, and
n power output measuring units that are each connected to at least one of the reference power generating units and are adapted to measure an actual output power from the respective reference power generating units,
wherein the system is adapted to estimate a power output of the remaining m-n power generating units based on measurements of the n reference power generation units.

As can be seen, this aspect, which may be regarded as an alternative to the first aspect that is falling within the same invention, is concerning a plurality of power generating units, wherein some of the power generating units are reference power generating units that are used to determine a power output of the other (non-reference) power generating units.

It shall be noted that, as far as it is applicable, all features, effects and advantages that are described with respect to the power management system according to the first aspect may also be applied to this power management system, and vice versa.

In this respect, the system may be adapted to estimate the power output of each of the m-n power generating units. This makes it possible to determine a respective power output for all power generating units that are part of the power management system.

In a further aspect, the present invention refers to a method for managing power distribution, comprising the steps
a power generating step in which electrical power is generated from a power generating unit using a non-electric power source,
a power output step in which the electrical power generated in the power generating step is output,
a power distributing step in which the electrical power generated in the power generating step is distributed to a household having a plurality of power consuming units and to a receiving unit, different from the household, wherein the receiving unit is a battery and/or a power grid,
a condition requirement setting step in which condition requirement data is received from a user that determine a required condition of the receiving unit and a time period after which the receiving unit has to satisfy the required condition,
a prediction data input step in which prediction data is received that indicates a prediction of the electrical power generated in the power generating step over the time period,
a control step in which the condition requirement data and the prediction data is received,
wherein the control step controls at least the power distributing step such that, after the time period has elapsed, the receiving unit is satisfying the required condition,
wherein the prediction data is based on at least a given maximum power output in the power generating step and a weather forecast for the time period and for the location where the non-electric power source is located.

It may already be mentioned at this point that all features, effects and advantages mentioned in correlation to the system according to the present invention may also be applied to the method according to the present invention, if applicable, and vice versa.

In view of the above detailed description of the system according to the present invention, it shall be summarized here that the method according to the present invention makes it possible to increase the "green percentage" (electrical power generated by the power generating unit) of the total required electrical energy that is necessary to attain the required condition of the receiving unit.

Also in the method according to the present invention, the prediction data may further be based on an actual power output of a reference power generating unit measured in a power output measuring step, wherein the reference power generating unit is remote from the power generating unit.

Advantageously, the reference power generating unit may be connected to a server and may send data indicating the actual power output of the reference power generating unit to the server being remote from the reference power generating unit and the power generating unit, and in the prediction data input step, prediction data may be received from the server, wherein the server may scale the prediction data, in particular with respect to at least one of a difference of a maximum power output of the reference power generating unit and the maximum power output of the power generating unit, a different orientation of the reference power generating unit and the power generating unit, a different inclination of the reference power generating unit and the power generating unit, a different weather forecast and/or a different actual weather of the reference power generating unit and the power generating unit, and a different location of the reference power generating unit and the power generating unit. So, an adaption of the prediction data may be performed at the server, thus, reducing the necessary processing capabilities at the location of the power generating unit.

The condition requirement data may be based on at least one event planned by the user, wherein each event is comprising a date and time and a destination, and wherein, before or in the condition requirement setting step, a distance from the location of the power generating unit to the destination and the time period may be calculated, and the condition requirement data may be based on the calculated distance and time period. That is, the method may automatically determine a required condition based on the parameters of an upcoming event. If, for example, the user has entered an appointment, e.g. in the calendar of her/his mobile phone, that is scheduled in two days and at a location that is 100 km away from the home of the user, the required condition may be set such that the user's EV can then at least travel the distance (and back). Of course, the method may also consider the travelling time from the home of the user to the destination and set an end of the time period after which the required condition has to be fulfilled to a time at which the user has to leave from her/his home (where applicable, including some extra time, in case the user plans to start earlier).

The method may further comprise a proposal step in which it is proposed to the user to extend the time period to a proposed extended time period after which the receiving unit has to satisfy the required condition such that a contribution of the electrical power generated from the power generating unit using the non-electric power source may be increased to satisfy the required condition. As an example, the user has set a departure time for the next day 8:00 a.m. and the required minimum SOC is set to 65%, the system or method according to the present invention may indicate to the user, e.g. via her/his mobile phone, that the percentage of the electrical power generated by the power generating unit ("green percentage") to reach this required condition based on the actual prediction data will be 85%. Then, the system or method according to the present invention may indicate to the user that the "green percentage" may be increased to 100%, if the user is shifting the departure time, e.g. to 10:00 a.m. Hence, the user gets the feedback and possibility to optimize the usage of the power generating unit and to reduce overall power costs.

An optimization of the overall power costs for a user may be expressed by the following goal function to maximize $$\text{profit} = \Sigma_{t \in T}(PV_t^{feed\_in} \times \text{price}_{feed\_in} - (\text{Power\_Purchase}_t^{EV\_charging} + \text{Power\_Purchase}_t^{household}) \times \text{price}_{power\_purchase}$$

wherein $$PV_t^{feed\_in} = \text{solar\_radiation}_t \times \text{Power}_{Factor} - PV_t^{EV\_charging} - PV_t^{household};$$

$$\text{Electricity\_demand}_t^{EV\_charging} = \text{Power\_Purchase}_t^{EV\_charing} + PV_t^{EV\_charging};$$

$$\text{Electricity\_demand}_t^{household} = \text{Power\_Purchase}_t^{household} + PV_t^{housing}.$$

Here, the calculation of the parameter Electricity_demand$_t^{EV\_charging}$ which indicates the necessary electrical power/energy to charge the EV's battery, is done according to the predicted availability of the EV and the predicted SOC of the battery. Based on the user input (or forecast) for the EV connection time, the maximum and minimum SOC is calculated for each timestamp. Consequential, the optimization model chooses for each timestamp the optimum amount of electricity for charging the EV. Next to this, the household consumption is also considered and is reflected in calculating the potential excess electricity of the PV system. An important factor for the calculation is Power$_{Factor}$, the factor for calculating the PV electricity based on the solar radiation. It includes, besides the system efficiency, the orientation and inclination of the PV panels. The parameters $PV_t^{EV\_charging}$ and $PV_t^{household}$ indicate the amount of electrical power generated from the power generating unit for charging the EV and for suppling the household over the time period t, respectively. The parameters Power_Purchase$_t^{EV\_charging}$ and Power_Purchase$_t^{household}$ indicate the amount of electrical power that has to be taken/bought from a power supplier for charging the EV and for suppling the household over the time period t, respectively. The parameter $PV_t^{feed\_in}$ indicates the amount of electrical power generated from the power generating unit that may be fed-in to a power grid of a power company. This parameter is multiplied by the monetary incentive price$_{feed\_in}$ to calculate the earnings for the user to feed-in power into the grid. Accordingly, the parameter price$_{power\_purchase}$ indicates the price to buy electrical power from the power supplier.

It shall be added here that the above description may not only be applicable to a home of a user but also to a working place or the like at which an EV of the user may be charged via a power plant installed at the work place.

BRIEF DESCRIPTION OF THE DRAWINGS

The present invention will be explained below in greater detail with reference to the accompanying drawings in which.

DESCRIPTION OF EXEMPLARY EMBODIMENTS

Figure 1:
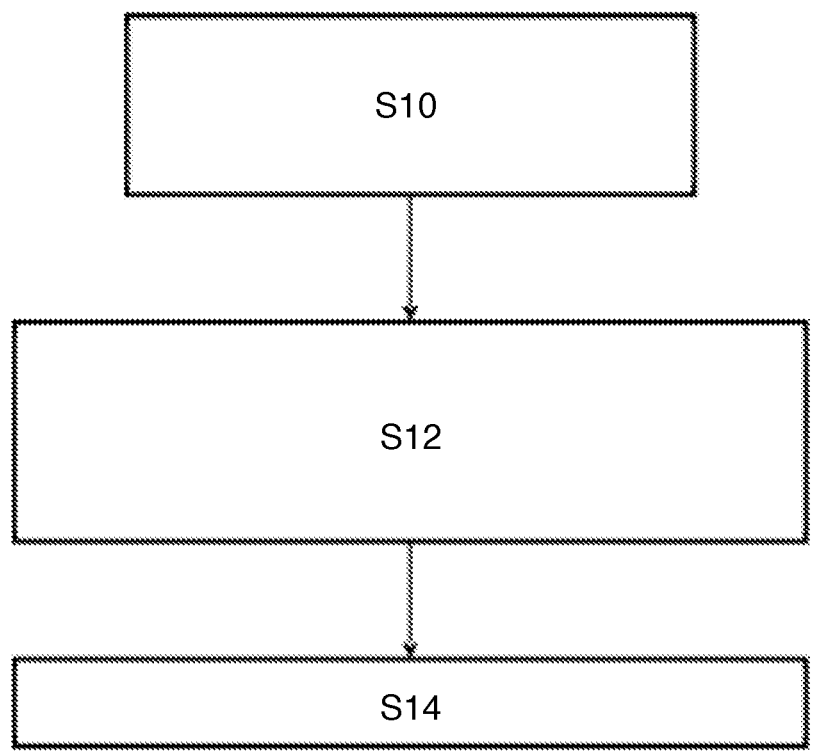
FIG. 1 shows a scheduling process for an optimized charging of an EV.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. FIG. 1 shows a scheduling process for the optimized scheduling of an EV charging using a solar power plant PV as the power generating unit.

The scheduling process of FIG. 1 begins in a step S10 in which a forecast for a solar radiation is imported. Furthermore, in step S10, an availability to charge the EV is updated by input of the user and/or by an automated prediction of the system/method according to the present invention. Additionally, if this parameter shall also be considered, an electricity price to sell/buy electric power to/from a power supplier may be updated as further input data.

Then, the process calculates in a step S12 a time series of input data for the optimization model for a preset time period, for example 72 to 96 hours. The time series are generated for a predicted PV production, that is the amount of electrical power generated by the power generating unit, a predicted consumption of the household (see FIG. 3), and a minimum and/or maximum SOC for the EV.

Then, the process proceeds to a step S14 in which a timetable for the optimized EV charging is calculated based on which the electrical power generated by the power generating unit is distributed to the household, the EV and/or the power grid or the amount of electrical power that has to be taken/bought from the power supplier.

Figure 2:
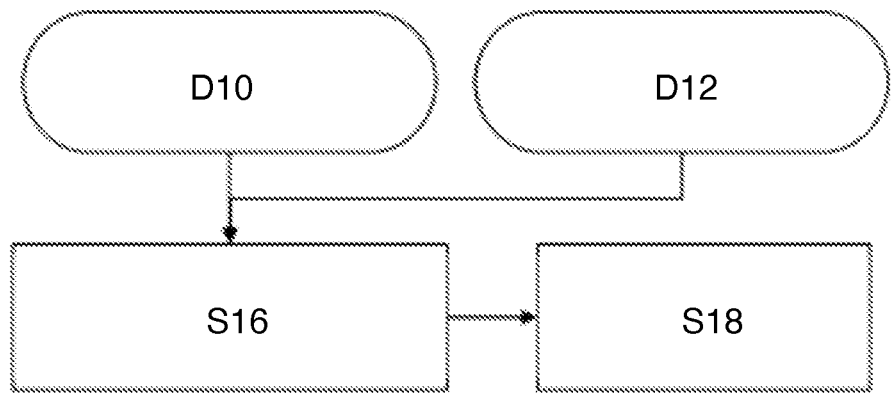
FIG. 2 shows a workflow regarding an adjustment of a parameter Power$_{Factor}$.

FIG. 2 illustrates a workflow to adjust the parameter $Power_{Factor}$ which indicates the amount of electrical power that is generated by the power generating unit (PV) based on the solar radiation. As input data D10 and D12, the actual amount of electric power that is generated at a reference power generating unit and prediction data that indicate a prediction of the amount of electrical power that is generated by the power generating unit are input into a step S16 of the workflow of FIG. 2. Then, in step S16, a deviation (or difference) between the reference power generating unit and the power generating unit is considered, such as different actual weather, a different weather forecast, different properties of both units regarding an electric power generating performance (maximum power output, inclination, orientation etc) and the like.

After the evaluation of the deviations between the reference power generating unit and the power generating unit in step S16, in a step S18, the parameter $Power_{Factor}$ is recalculated and output to the superimposed method according to the present invention.

Figure 3:
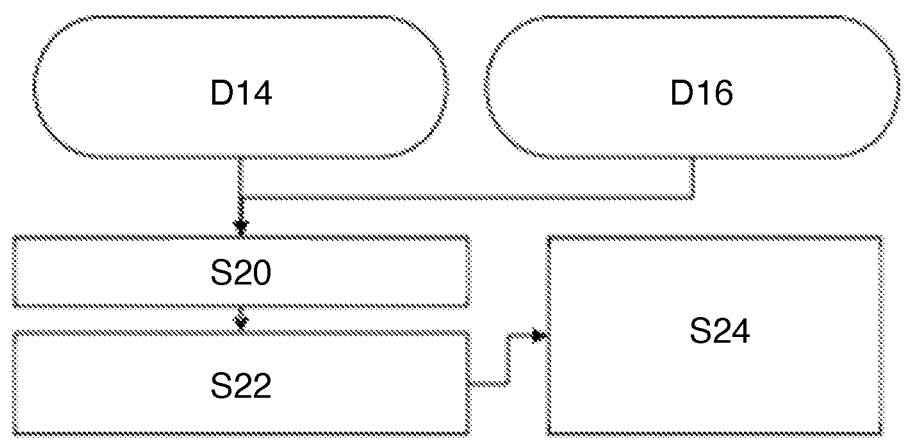
FIG. 3 shows a workflow regarding a prediction of a household consumption.

In FIG. 3, a workflow is illustrated to predict a consumption of the household that is connected to the power generating unit. As input data D14 and D16, actual data regarding the consumption of the household that is connected to the reference power generating unit (that may also be considered to be a reference household) and prediction data of a consumption of electric power for the household that is connected to the power generating unit are input into a step S20. In this step S20, similar to the step S16 of the workflow of FIG. 2, a deviation between the reference household and the household is evaluated.

Then, in a step S22, it may be considered for the prediction of the household consumption, that is scaled in relation to the reference household based on the evaluated deviations, if the user (living in the household connected to the power generating unit) has updated consumption data of the household for a past time period, for example, the past year. Based on the updated consumption data, the scaling between the consumption of the reference household and the household may be more accurate.

Then, in a step S24, an assumed load profile of the household of the user is recalculated and output to a superimposed method or workflow.

Figure 4A:
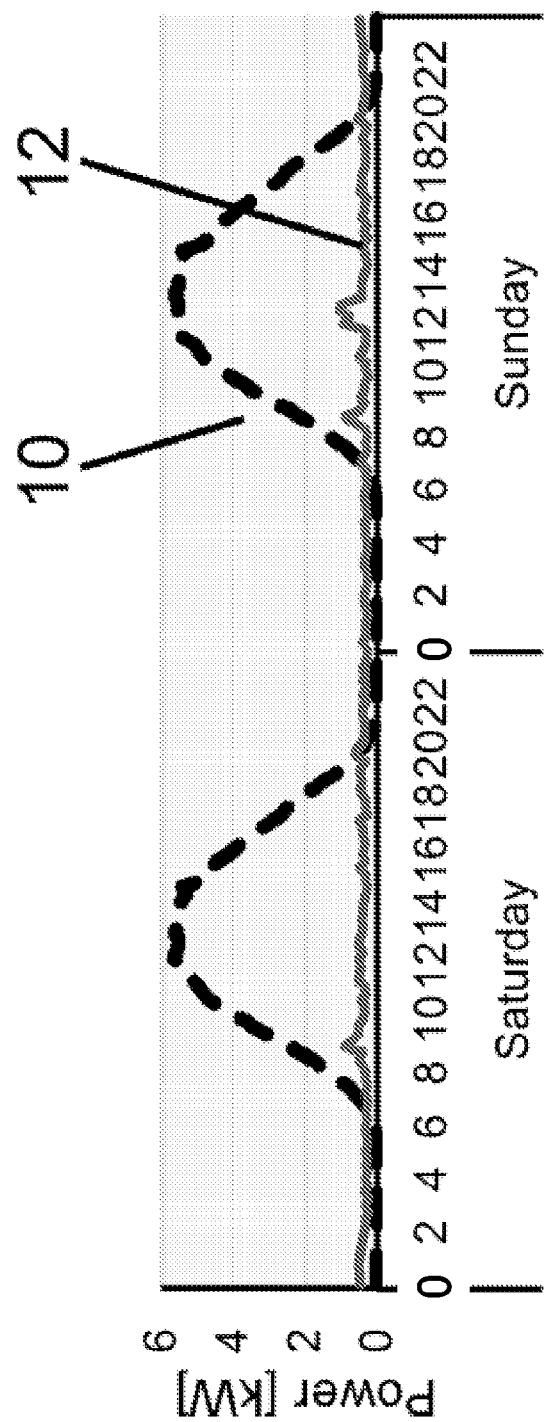
FIG. 4a shows an example of an optimization model for an optimized charging of an EV.
Figure 4B:
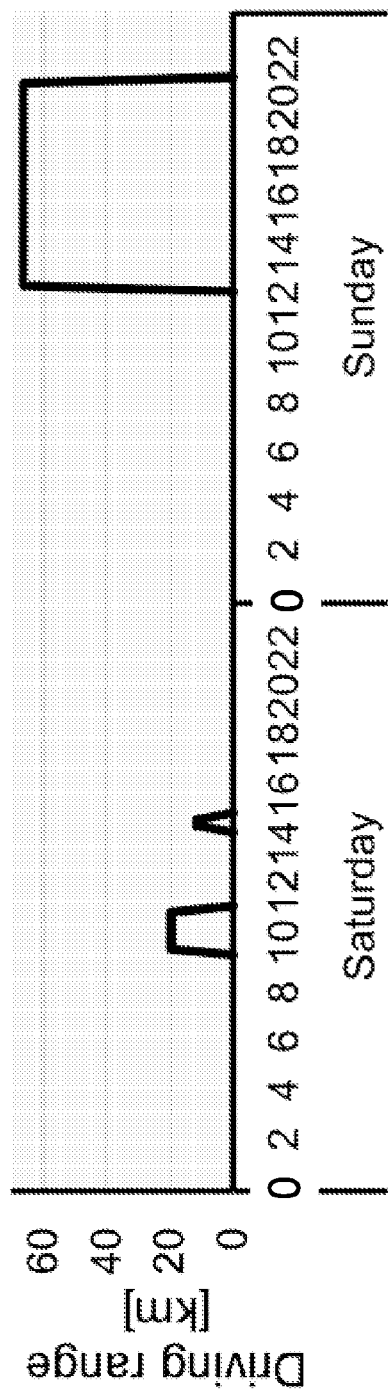
FIG. 4b shows an example of an optimization model for an optimized charging of an EV.

In FIGS. 4a to 4d, an example of an optimization model is shown. FIGS. 4a and 4b depict time series for the input data of a forecast of the amount of electrical power generated by the power generating unit (curve 10 in FIG. 4a) and a forecast for the consumption of electrical power for the household (curve 12 in FIG. 4a). The power is shown on the Y-axis in [kW] and the X-axis is illustrating the time, here for the days Saturday and Sunday as an example.

FIG. 4b shows a forecast of a battery discharge by driving the EV, wherein, in FIG. 4b, the Y-axis is representing a driving range in [km] and the X-axis is again representing the days Saturday and Sunday.

Figure 4C:
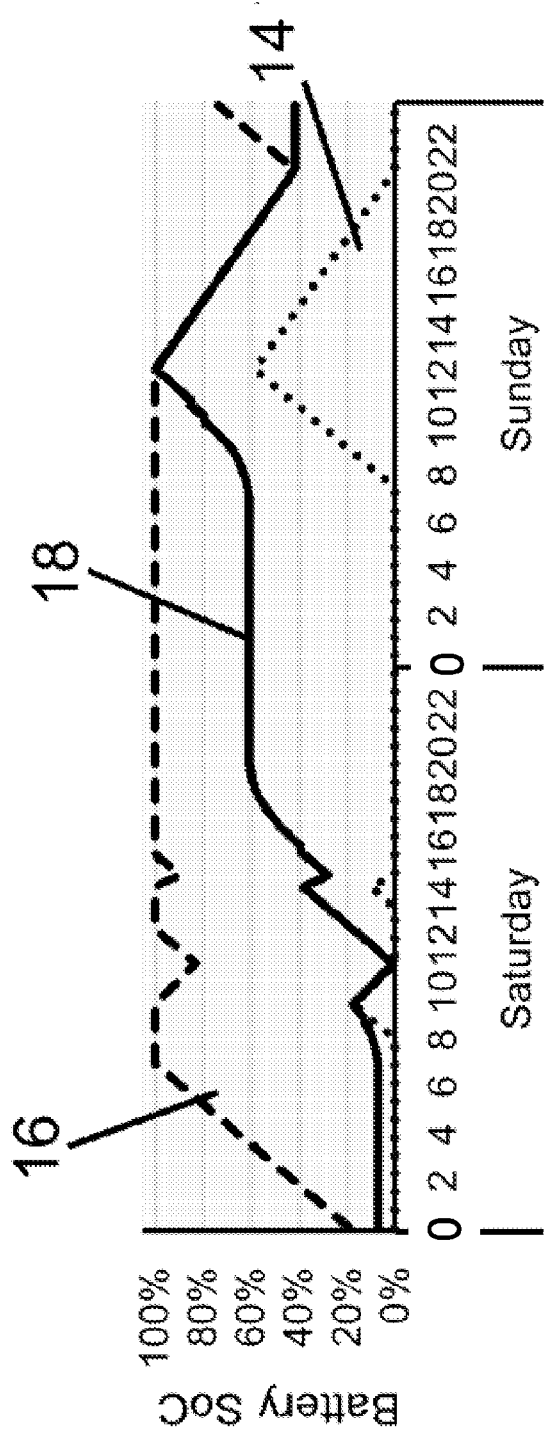
FIG. 4c shows an example of an optimization model for an optimized charging of an EV.

Now, based on the above input data, and an according availability forecast to charge the EV, a strategy for a minimum SOC (curve 14 in FIG. 4c) and for a maximum SOC (curve 16 in FIG. 4c) are shown as input for the optimization model of an optimized SOC charging strategy that is indicated by a curve 18 in FIG. 4c.

Here, the Y-axis is representing an SOC of the EV's battery, and the X-axis is the same as in FIGS. 4a and 4b.

Figure 4D:
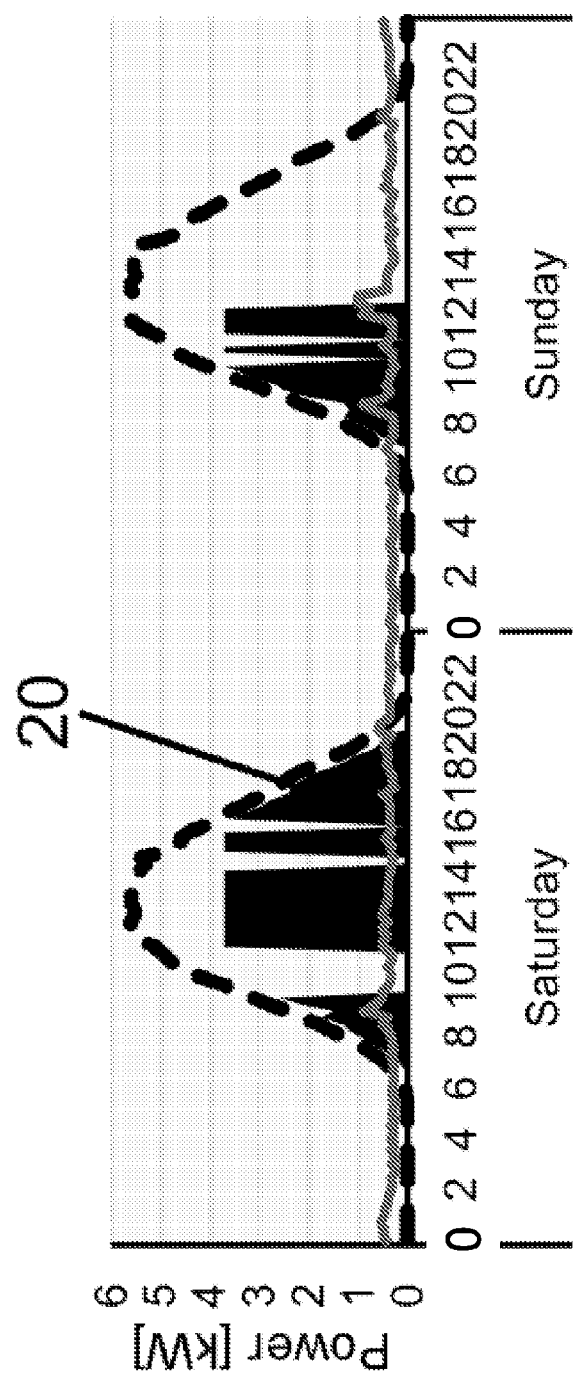
FIG. 4d shows an example of an optimization model for an optimized charging of an EV.

As a result, FIG. 4d shows a solution of the optimization model with an output of an optimum SOC and accordingly derived charging times that are indicated by the areas 20 in FIG. 4d. As in FIG. 4a, the Y-axis is representing the amount of electrical power in [kW] and the X-axis is representing the exemplary days Saturday and Sunday.

Figure 5:
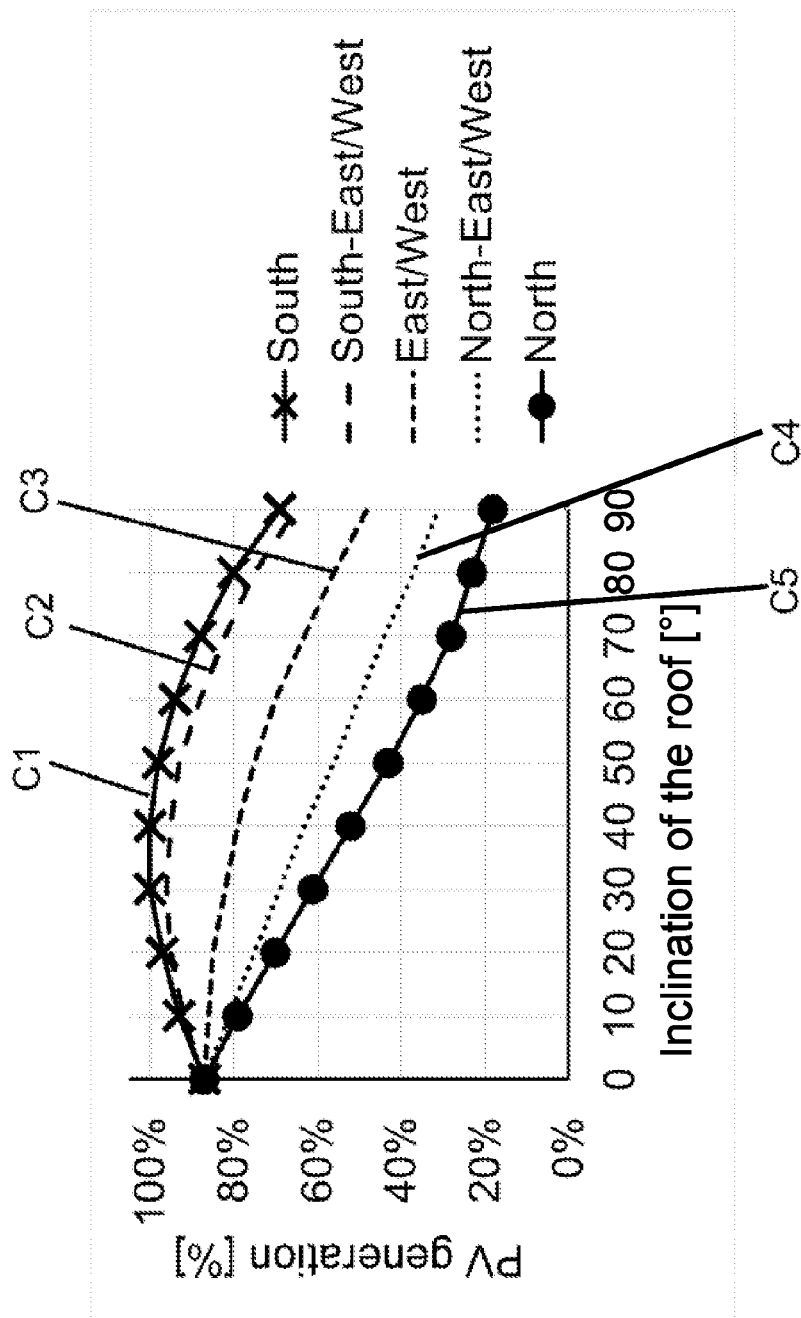
FIG. 5 shows a graph comprising different curves for different geographic orientations that are indicating a relationship between solar radiation and tilt angle of a PV panel.

FIG. 5 shows a graph comprising different curves for different geographic orientations that are indicating a relationship between PV generation in % as received by the panel and inclination angle of an according PV panel (with respect to the ground). That is, as it is also indicated by the type of line, the curve C1 shown in FIG. 5 represents a PV panel that is orientated to the south, the curve C2 represents a PV panel that is orientated to the southwest or southeast, the curve C3 represents a PV panel that is orientated to the west or to the east, the curve C4 represents a PV panel that is orientated to the northwest or northeast, and the curve C5 represents a PV panel that is orientated to the north. Obviously, the graph of FIG. 5 may be valid for the northern hemisphere of the earth, in particular the location of Germany, since the curve C1 for the south-orientated solar panel shows the highest received solar radiation. Also, the curve C1 shows a higher received solar radiation at an inclination of about 30° to 40° than above or below that range. Regarding the curve C5, the received solar radiation even decreases when the solar panel is tilted more strongly. But, respective graphs may be created for each specific location of a PV panel system. The graph of FIG. 5 is based on data derived from the source https://www.rechnerphotovoltaik.de/photovoltaik/voraussetzungen/dachausrichtung.

The above described graph shows that it may be beneficial to use multiple reference sites in order to have sufficiently matching reference and target sites. The graph also may be used to compensate the difference between the target house and the reference site (by using, for example, PV orientation, weather conditions, total solar radiation, panel type, area of the PV, PV cell efficiency etc.) such that the amount of PV power generation in the target house can be predicted from the measured values at the reference site more accurately. In other words, the graph of FIG. 5 may be used to convert the amount of change from the total amount of solar radiation (0 degrees). The area of the PV may be used to provide a proportional conversion based on a total installation area. The solar cell efficiency may be used to provide a proportional conversion based on the rated efficiency of the solar panel. Further, for the total solar radiation values of nearby solar radiation meters may be used. If a distance between the target house and the reference site is short, there may be no conversion required.

The power generation of the target house may be determined using the below formula:

PV generation=Total solar radiation [Wh/m$^2$]×area [m$^2$]×(tilt angle/orientation conversion)×solar cell efficiency (type and performance of solar cells).

To explain the above formula, in order to calculate the PV power generation of the target house (power generating unit PV) the specific solar panel installed at the target house, that is defined by its solar cell efficiency and its area, is scaled to the PV system installed at the reference site by multiplying it with the tilt angle/orientation conversion and is then multiplied by the available total solar radiation.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a power management system and method for managing power distribution.

What is claimed is:

1. A power management system comprising:
a power generating unit that is adapted to generate electrical power from a non-electric power source,
a power output unit that is adapted to output the electrical power generated by the power generating unit to a power distributing unit, wherein the power distributing unit is adapted to distribute the electrical power generated by the power generating unit to a household having a plurality of power consuming units, to a receiving unit, different from the plurality of power consuming units of the household, wherein the receiving unit is a battery, and/or to a power grid,
a grid power output unit that is adapted to output electrical power supplied from the power grid to the household and/or to the receiving unit,
a condition requirement setting unit that is adapted to receive condition requirement data from a user that determine a required condition of the receiving unit and a time period after which the receiving unit has to satisfy the required condition,
a prediction data input unit that is adapted to receive prediction data that indicates a prediction of the electrical power generated by the power generating unit over the time period, and
a control unit that is adapted to receive the condition requirement data from the condition requirement setting unit and the prediction data from the prediction data input unit,
wherein the control unit is adapted to control at least the power distributing unit such that, after the time period has elapsed, the receiving unit is satisfying the required condition, and is adapted to maximize a percentage of using electrical power generated by the power generating unit in relation to electrical power supplied to the household and/or to the receiving unit from the power grid to satisfy the required condition of the receiving unit within the time period by using the prediction data,
wherein the prediction data is based on at least one of a given maximum power output of the power generating unit, an availability of the receiving unit within the time period, and a weather forecast for the time period and for a location where the power generating unit is located,
wherein the power management system is adapted to record regular use of the receiving unit and to set the required condition based on the regular use of the receiving unit without input by the user, and
the battery is installed in an electric vehicle or a hybrid electric vehicle and/or at a location of the power generating unit as a battery for the household,
wherein the prediction data is further based on an actual power output of a reference power generating unit measured by a power output measuring unit connected to the reference power generating unit,
wherein the reference power generating unit and the power output measuring unit are remote from the power generating unit,
wherein
the reference power generating unit is connected to a server and is adapted to send data indicating the actual power output of the reference power generating unit to the server being remote from the reference power generating unit and the power generating unit, and
the prediction data input unit is adapted to receive the prediction data from the server,
wherein the server is adapted to scale the prediction data,
wherein the condition requirement setting unit and/or the prediction data input unit and/or the control unit is part of the server such that the user is sending the condition requirement data to the server, wherein the power distributing unit is controlled via a remote connection by the server.

2. The power management system according to claim 1, wherein
the prediction data for the power generating unit based on the actual power output of the reference power generating unit is scaled with respect to at least one of a difference of a maximum power output of the reference power generating unit and the maximum power output of the power generating unit, a different orientation of the reference power generating unit and the power generating unit, a different inclination of the reference power generating unit and the power generating unit, a different weather forecast and/or a different actual weather of the reference power generating unit and the power generating unit, and a different location of the reference power generating unit and the power generating unit.

3. The power management system according to claim 2, wherein
the power management system further comprises a storage unit that is adapted to record and store a difference of a predicted condition of the receiving unit after the time period and an actual condition of the receiving unit after the time period and/or a difference of a predicted time period necessary to reach the required condition of the receiving unit and an actual time period necessary to reach the required condition of the receiving unit,
wherein the prediction data for the power generating unit is further based on the difference stored in the storage unit,
wherein the storage unit is further adapted to record and store the difference in correlation to a specific date and time.

4. The power management system according to claim 1, wherein
the power management system further comprises a storage unit that is adapted to record and store a difference of a predicted condition of the receiving unit after the time period and an actual condition of the receiving unit after the time period and/or a difference of a predicted time period necessary to reach the required condition of the receiving unit and an actual time period necessary to reach the required condition of the receiving unit,
wherein the prediction data for the power generating unit is further based on the difference stored in the storage unit,
wherein the storage unit is further adapted to record and store the difference in correlation to a specific date and time.

5. The power management system according to claim 1, wherein
the non-electric power source is at least one of a photovoltaic solar power plant, a wind generator, a geothermal energy source, a hydrodynamic energy source, and a biomass energy source.

6. The power management system according to claim 1, wherein
the required condition of the receiving unit is a state of charge of the battery and/or a feed-in rate of the electrical power generated by the power generating unit to the power grid.

7. The power management system according to claim 1, further comprising:
an amount of m power generating units that are each adapted to generate electrical power from the non-electric power source, wherein m is a natural number and m≥2,
wherein out of the m power generating units, an amount of n are reference power generating units, wherein n is a natural number and n<m, and
n power output measuring units that are each connected to at least one of the reference power generating units and are adapted to measure an actual output power from the respective reference power generating units,
wherein the system is adapted to estimate a power output of remaining m-n power generating units based on measurements of the n reference power generation units.

8. The power management system according to claim 7, wherein the system is adapted to estimate the power output of each of the m-n power generating units.

9. A method for managing power distribution, comprising the steps:
a power generating step in which electrical power is generated from a power generating unit using a non-electric power source,
a power output step in which the electrical power generated in the power generating step is output,
a power distributing step in which the electrical power generated in the power generating step is distributed to a household having a plurality of power consuming units and to a receiving unit, different from the plurality of power consuming units of the household, wherein the receiving unit is a battery, and/or to a power grid,
recording a regular use of the receiving unit,
setting a required condition based on the regular use of the receiving unit without input by a user,
a condition requirement setting step in which condition requirement data is received from the user that determine the required condition of the receiving unit and a time period after which the receiving unit has to satisfy the required condition,
a prediction data input step in which prediction data is received that indicates a prediction of the electrical power generated in the power generating step over the time period, and
a control step in which the condition requirement data and the prediction data is received,
wherein the control step controls at least the power distributing step such that, after the time period has elapsed, the receiving unit is satisfying the required condition,
wherein the prediction data is based on at least a given maximum power output in the power generating step and a weather forecast for the time period and for a location where the non-electric power source is located, and
the battery is installed in an electric vehicle or a hybrid electric vehicle and/or at a location of the power generating unit as a battery for the household,
wherein
the prediction data is further based on an actual power output of a reference power generating unit measured in a power output measuring step,
wherein the reference power generating unit is remote from the power generating unit,
wherein
the reference power generating unit is connected to a server and sends data indicating the actual power output of the reference power generating unit to the server being remote from the reference power generating unit and the power generating unit, and
in the prediction data input step, the prediction data is received from the server,
wherein the server scales the prediction data with respect to at least one of a difference of a maximum power output of the reference power generating unit and the maximum power output of the power generating unit, a different orientation of the reference power generating unit and the power generating unit, a different inclination of the reference power generating unit and the power generating unit, a different weather forecast and/or a different actual weather of the reference power generating unit and the power generating unit, and a different location of the reference power generating unit and the power generating unit.

10. The method according to claim 9, wherein
the receiving unit is the battery of the electric vehicle and
the condition requirement data is based on at least one event planned by the user, wherein each event is comprising a date and time and a destination of the electric vehicle, and
in that, before or in the condition requirement setting step, a distance from the location of the power generating unit to the destination and the time period are calculated, and the condition requirement data is based on the calculated distance and time period.

11. The method according to claim 9, wherein
the method further comprises a proposal step in which it is proposed to the user to extend the time period to a proposed extended time period after which the receiving unit has to satisfy the required condition such that a contribution of the electrical power generated from the power generating unit using the non-electric power source is increased to satisfy the required condition.

* * * * *